(12) United States Patent
Ahluwalia (10) Patent No.: US 9,139,953 B2
(45) Date of Patent: Sep. 22, 2015

(54) ASPHALT EMULSIONS, PRODUCTS MADE FROM ASPHALT EMULSIONS, AND PROCESSES FOR MAKING FIBROUS MATS FROM ASPHALT EMULSIONS

(71) Applicant: Building Materials Investment Corporation, Dallas, TX (US)

(72) Inventor: Younger Ahluwalia, Desoto, TX (US)

(73) Assignee: Building Materials Investment Corporation, Dallas, TX (US)

( * ) Notice: Subject to any disclaimer, the term of this patent is extended or adjusted under 35 U.S.C. 154(b) by 0 days.

(21) Appl. No.: 14/446,739

(22) Filed: Jul. 30, 2014

(65) Prior Publication Data

US 2014/0338850 A1    Nov. 20, 2014

Related U.S. Application Data

(62) Division of application No. 13/705,971, filed on Dec. 5, 2012, now Pat. No. 8,841,364, which is a division of application No. 13/348,426, filed on Jan. 11, 2012, now Pat. No. 8,415,412, which is a division of application No. 12/625,935, filed on Nov. 25, 2009, now Pat. No. 8,114,927.

(60) Provisional application No. 61/117,734, filed on Nov. 25, 2008, provisional application No. 61/117,735, filed on Nov. 25, 2008, provisional application No. 61/117,739, filed on Nov. 25, 2008, provisional application No. 61/117,742, filed on Nov. 25, 2008, provisional application No. 61/118,044, filed on Nov. 26, 2008.

(51) Int. Cl.
| | |
|---|---|
| *C08L 95/00* | (2006.01) |
| *D21H 13/40* | (2006.01) |
| *D06N 5/00* | (2006.01) |
| *C09D 195/00* | (2006.01) |
| *E04D 1/20* | (2006.01) |
| *E04D 1/22* | (2006.01) |
| *C08L 91/06* | (2006.01) |

(52) U.S. Cl.
CPC .............. *D06N 5/003* (2013.01); *C08L 95/005* (2013.01); *C09D 195/005* (2013.01); *D21H 13/40* (2013.01); *E04D 1/20* (2013.01); *E04D 1/22* (2013.01); *C08L 91/06* (2013.01); *C08L 2555/74* (2013.01); *C08L 2555/80* (2013.01); *Y10T 442/60* (2015.04)

(58) Field of Classification Search
CPC ............ D06N 5/003; E04D 1/20; E04D 1/22; D21H 13/40
USPC .......................................................... 524/59
See application file for complete search history.

(56) References Cited

U.S. PATENT DOCUMENTS

| | | | |
|---|---|---|---|
| 2,701,777 | A |  2/1955 | Farris |
| 2,731,066 | A |  1/1956 | Hogendobler et al. |
| 4,135,029 | A |  1/1979 | Pfeffer |
| 4,178,203 | A | 12/1979 | Chakrabarti |
| 4,178,204 | A | 12/1979 | Chakrabarti |
| 4,178,206 | A | 12/1979 | Chakrabarti |
| 4,179,331 | A | 12/1979 | Chakrabarti |
| 4,211,575 | A |  7/1980 | Burris |
| 4,233,353 | A * | 11/1980 | Bondoc et al. ................ 428/141 |
| 4,523,957 | A |  6/1985 | Graf et al. |
| H1250 | H | 11/1993 | Gilmore et al. |
| 5,407,536 | A |  4/1995 | Razac et al. |
| 5,472,776 | A | 12/1995 | Gallagher et al. |
| 5,744,229 | A * |  4/1998 | Gleason et al. ............ 428/297.4 |
| 5,965,257 | A | 10/1999 | Ahluwalia |
| 6,341,462 | B2 |  1/2002 | Kiik et al. |
| 6,585,813 | B2 |  7/2003 | Kiik et al. |
| 6,706,787 | B1 |  3/2004 | Burris et al. |
| 6,708,456 | B2 |  3/2004 | Kiik et al. |
| 6,817,152 | B2 | 11/2004 | Peng et al. |
| 7,272,915 | B2 |  9/2007 | Peng |
| 7,857,904 | B2 | 12/2010 | Trumbore et al. |
| 7,951,239 | B2 |  5/2011 | Trumbore et al. |
| 2008/0141898 | A1 |  6/2008 | Fields |

\* cited by examiner

*Primary Examiner* — Hui Chin
(74) *Attorney, Agent, or Firm* — Fitzpatrick, Cella, Harper & Scinto (57) ABSTRACT

The invention relates to asphalt emulsions comprising an asphalt component selected from the group consisting of a solvent extracted asphalt, an oxidized asphalt, and combinations thereof. The invention also relates to products made therefrom, including fibrous mats comprising a fiber component, such as glass fibers, and a binder component comprising an asphalt emulsion. The invention further relates to wet-laid processes for manufacturing fibrous mats and that employ the use of an amphoteric surfactant, which is applied to a wet fiber web prepared from a dispersion of fiber components, such as glass fibers.

21 Claims, 1 Drawing Sheet

ASPHALT EMULSIONS, PRODUCTS MADE FROM ASPHALT EMULSIONS, AND PROCESSES FOR MAKING FIBROUS MATS FROM ASPHALT EMULSIONS

CROSS-REFERENCE TO RELATED APPLICATIONS

This application is a divisional of U.S. Non-Provisional Application No. 13/705,971, filed on Dec. 5, 2012, which is a divisional of U.S. Non-Provisional Application No. 13/348,426, filed on Jan. 11, 2012, now U.S. Pat. No. 8,415,412, which is a divisional of U.S. Non-Provisional Application No. 12/625,953, filed Nov. 25, 2009, now U.S. Pat. No. 8,114,927, which claims the benefit of U.S. Provisional Application No. 61/117,734, filed Nov. 25, 2008; U.S. Provisional Application No. 61/117,735, filed Nov. 25, 2008; U.S. Provisional Application No. 61/117,739, filed Nov. 25, 2008; U.S. Provisional Application No. 61/117,742, filed Nov. 25, 2008; and U.S. Provisional Application No. 61/118,044, filed Nov. 26, 2008, all of which are incorporated herein by reference in their entirety.

BACKGROUND OF THE INVENTION

1. Field of the Invention

This invention relates to asphalt emulsions, products made from asphalt emulsions, in particular to fibrous mats useful for making building materials, and processes for manufacturing the fibrous mats. The fibrous mats made with the asphalt emulsions of the invention allow for the preparation of lighter than traditional fibrous mats while providing excellent tear resistance and tensile strength.

2. Description of the Prior Art

High strength, uniform thin sheets of glass fibers are important in the building materials industry. These products are typically used in roofing shingles.

In the past, asphalt roofing shingles have been constructed of an organic rag felt impregnated and coated with asphalt or other bituminous substance. However, asphalt-impregnated rag felt mats are difficult to manufacture in large quantities and are costly.

Glass fiber mats were developed in an attempt to improve upon the more-expensive and difficult to process asphalt-impregnated rag felt mats. There are numerous glass mats described in the art that are formed commercially of glass fibers. These mats include glass fibers held together by binder materials. A common binder material used in glass mats is urea-formaldehyde, which may be deemed undesirable if toxic formaldehyde is released from the mats, when they are stored.

Efforts have been made to improve glass mat strength. These efforts have focused on modifying the binders used in making fiber mats, the processes employed in manufacturing the glass mats and/or the fibrous composition of the mats.

U.S. Pat. No. 2,731,066 describes a glass fiber mat formed from a dry process. The mat includes chopped glass fibers arranged in a haphazard pattern reinforced with continuous strands, yarns or slivers bound together with a bonding agent. Suitable bonding agents disclosed in U.S. Pat. No. 2,731,066 include asphaltic compounds, coal tar products, pitch, phenol formaldehyde resins, rubber, starch, sugar, gelatin, polystyrene, methyl methacrylate or like products.

U.S. Pat. No. 4,135,029 discloses a wet-laid process for making glass fiber mats which have improved tear strength over glass mats made by the dry process. The mats include at least some randomly oriented chopped glass fibers and fiberglass strands, yarns or slivers embedded in separate layers therein. U.S. Pat. No. 4,135,029 states that commonly known bonding agents may be used to bond the fibers together, such as urea resins, phenolic resins, bone glue, polyvinyl alcohol, polyvinyl acetates and various compound and stabilizing reagents.

U.S. Pat. No. 4,178,203 relates to the manufacture of glass fiber mat products made by the wet-laid process wherein the wet fibrous web is treated with an anionic surfactant at any time after the web is prepared and before binder is applied to the mat. The resultant mat is said to have increased wet-strength.

U.S. Pat. No. 4,178,204 relates to the manufacture of glass fiber mat products made by the wet-laid process wherein a wet fibrous web is prepared that is treated with an anionic polyelectrolyte prior to binder being applied to the mat. The anionic polyelectrolytes are either soluble in water or can provide soluble dispersible salts in water, such as with an alkali metal hydroxide, ammonia or a low molecular weight organic amine. The resultant mat is said to have increased wet-strength.

U.S. Pat. No. 4,178,206 relates to the manufacture of glass fiber mat products made by the wet-laid process wherein glass fiber dispersions are prepared by mixing chopped glass fibers in water with a small amount of a select group of cationic quaternary ammonium compounds which have at least two long chain groups as part of the molecule. The resultant dispersions are said to have a relatively high glass fiber consistency.

U.S. Pat. No. 4,179,331 relates to the manufacture of glass fiber mat products made by the wet-laid process wherein glass fiber dispersions are prepared by mixing chopped glass fibers in water with a small amount of an amine oxide surfactant. The resultant dispersions are said to have a relatively high glass fiber consistency.

U.S. Pat. No. 5,407,536 relates to the manufacture of glass fiber mat products made by the wet-laid process wherein glass fiber compositions are prepared by mixing chopped glass fiber bundles in water with a small amount of an alkylamidoalkyl sultaine surfactant, which is amphoteric, to disperse the bundles into individual fibers prior to preparing the wet fibrous web. The resultant dispersions are said to have a relatively high glass fiber consistency.

U.S. Pat. No. 2,701,777 discloses asphaltic emulsions and glass mats made from the asphaltic emulsions. The asphaltic emulsions are used in the preparation of glass fiber mats. The asphaltic emulsions are made with an anionic component in the form of a fatty acid ester or mixed fatty acid esters of polyethylene glycol, the palmitic acid ester of diethylene glycol and the oleic acid ester of triethylene glycol, castor oil fatty acids of triethylene glycol and palm oil fatty acid esters of diethylene glycol.

U.S. Pat. No. 4,233,353 discloses glass fiber mats constructed from two fibrous components, including individual filaments, which provide a uniform denseness for impregnation of saturant asphalt to the mat after its formation, and extended fiber elements formed by longitudinal extension and connection of fibers from bundles of glass fibers in a wet-laid process, which furnish tear resistance. The glass fibers are bonded together with any commercially available binder, such as urea-formaldehyde or phenol-formaldehyde resins.

U.S. Pat. No. 5,744,229 discloses a glass fiber mat that contains from 68% to 90% glass fibers and from 10% to 32% binder. The binder contains from 2% to 90% polymer modified asphalt and from 10% to 98% thermosetting resin by weight of the binder. The preferred asphalt is AC grades of asphalt because they are soft and easily emulsified. The tear strength of the disclosed glass fiber mats, as shown in Table 1 of U.S. Pat. No. 5,744,229, was better than a control glass fiber mat made with a conventional binder containing SBR polymer and urea formaldehyde resin, although the tensile strength was not as good as the control.

U.S. Pat. No. 6,817,152 discloses a glass fiber mat having improved tear resistance that includes randomly oriented glass fibers, a polysiloxane compound and a formaldehyde-type binder containing a binder modifier which is a crosslinked styrene/acrylic polymer.

It is an object of the present invention to provide new and improved asphalt emulsions which allow for the economic manufacture of products made from asphalt emulsions, such as fibrous mats. It is also an object of the present invention to provide fibrous mats that are made with asphalt emulsions which allow for the preparation of fibrous mats that are strong, light weight and possess excellent tear resistance and tensile strength. It is a further object of the present invention to provide new and improved processes for manufacturing wet fibrous webs which have improved wet-strength. The processes are useful for preparing fibrous mats, such as the fiber mats of the present invention. The processes of the present invention employ an amphoteric surfactant which is applied to the wet-laid fiber web prior to the application of binder.

SUMMARY OF THE INVENTION

In accordance with the invention, new and improved asphalt emulsions are provided for the economic manufacture of products made from asphalt emulsions, such as products used in the building industry and as a coating material. In particular, the invention provides for fibrous mats and roofing materials that are made from asphalt emulsions and that have excellent tear resistance and tensile strength. The invention further provides for cost effective processes of manufacturing fibrous mats, which may be lighter in weight than conventional fibrous mats used in the building industry.

The asphalt emulsion may include combinations of the following: an asphalt component, a dispersant, a thixotropic agent, a surfactant, a catalyst, an aromatic oil, a resin, a cross-linking agent, a plasticizer, a wax, and a polymer. In one embodiment, the asphalt component is selected from the group consisting of solvent extracted asphalts, oxidized asphalts and combinations thereof.

In a preferred embodiment of the invention, the asphalt emulsion consists essentially of an asphalt component, a dispersant, a thixotropic agent, a surfactant, a catalyst, an aromatic oil, and optionally, a polymer. In another preferred embodiment of the invention, the asphalt emulsion consists essentially of an asphalt component, a dispersant, a thixotropic agent, a resin, and optionally, a polymer. In yet another preferred embodiment of the invention, the asphalt emulsion consists essentially of an asphalt component, a dispersant, a thixotropic agent, a surfactant, a catalyst, a resin, and optionally, a polymer. In a further preferred embodiment of the invention, the asphalt emulsion consists essentially of an asphalt component, a surfactant, a catalyst, a resin, a cross-linking agent, a plasticizer, a wax, and optionally, a polymer.

In an embodiment of the invention, the asphalt emulsion may also include any bituminous material, such as tars, pitches or asphalts, including asphalts that are natural or petroleum derived.

In a particularly preferred embodiment, the solvent extracted asphalt of the invention is propane deasphalted asphalt (PDA). Preferred oxidized asphalts include Type I, Type II, Type III and Type IV asphalts.

The present invention further relates to building materials, such as roofing shingles, gypsum boards and underlayment made with fibrous mats, and coating materials used, for example, for athletic surfaces, playgrounds, coatings on roofs and the like. Fibrous mats of the present invention comprise a fiber component and a binder component. Suitable fiber components include glass fibers, preferably prepared by a wet-laid process. Preferably, the glass fibers are from about 1.0" to about 1⅜" in length. An exemplary binder component comprises asphalt emulsions of the present invention. The asphalt emulsion binds together randomly oriented glass fibers made by a wet laid process to form a glass fiber mat having excellent tear resistance and tensile strength.

The processes of the invention relate to wet-laid processes for manufacturing fibrous mats and employ the use of an amphoteric surfactant, which is applied to a wet fiber web prepared from a dispersion of fiber components. Suitable fiber components include randomly oriented glass fibers preferably prepared by a wet-laid process. Preferably, the glass fibers are from about 1.0" to about 1⅜" in length The amphoteric surfactant may be applied to the wet fiber web by any means known in the art. In a preferred embodiment, the amphoteric solution is a dilute solution which is applied to the wet fiber web after the web is prepared but before the binder component is applied.

In a preferred embodiment, the processes of the invention comprise treating a wet fiber web with an amphoteric surfactant. The wet fiber web may be prepared by combining chopped glass fibers, water, a dispersant and a viscosity modifier in a head box to form a dispersion of glass fibers. The dispersion of glass fibers may then be applied to a conveyor in the presence of a vacuum to form a wet fiber web. After the amphoteric surfactant is applied to the wet fiber web, a binder component may then be applied, preferably simultaneously with the application of a vacuum. An exemplary binder component comprises asphalt emulsions of the present invention. Once the binder is applied, the wet fiber web may be dried in an oven and then may further be exposed to infrared rays. The binder may be heated to 165° F. to allow better adhesion of the materials to the glass fibers before curing.

BRIEF DESCRIPTION OF THE DRAWING

For a better understanding of the present invention, reference is made to the following drawing. Referring to the Drawing.

DETAILED DESCRIPTION

Asphalt Emulsions

In the present invention, asphalt emulsions for use, e.g., in building materials are provided. The asphalt emulsions are particularly useful for the preparation of fibrous mats that may be employed in building materials, such as roofing shingles, gypsum boards and underlayment. The asphalt emulsion comprises an asphalt component. In a preferred embodiment, the asphalt component is selected from the group consisting of solvent extracted asphalt, oxidized asphalt, and combinations thereof. The asphalt emulsion may further comprise a bituminous material such as tars, pitches or asphalts, including asphalts that are natural or petroleum derived. In one embodiment, the petroleum derived asphalt is paving grade asphalt such as asphalt cement (AC), including AC-2.5, AC-5, AC-10, AC-20, AC-30 and AC-40.

In a preferred embodiment, the asphalt component is solvent extracted asphalt. Solvent extraction techniques are well-known in the art for preparing solvent extracted asphalt compositions. These techniques typically employ alkanes, such as propane, as the solvent and are commonly referred to as deasphalting techniques. The asphalt compositions obtained by deasphalting techniques may be referred to as propane extracted asphalt (PEA), propane washed asphalt (PWA), or propane deasphalted asphalt (PDA). The solvent extracted asphalt compositions are obtained from treating a normal crude oil and/or residue feedstock with an alkane, such as propane, to obtain a treated asphalt in which the general level of saturates, compared to the originally treated material, is decreased, and the amount of asphaltenes is generally increased. In a preferred embodiment, the solvent extracted asphalts of the invention contain asphaltenes generally in the amount of about 25% to about 35% by weight and more typically from about 30% to about 35% by weight. The solvent extracted asphalt compositions may be made with bituminous material, such as tars, pitches or asphalts. The solvent extracted asphalt compositions are relatively inexpensive because they are the residue of processes for obtaining the higher value oil portions from the petroleum source. The solvent extracted asphalts are typically very hard and not easily manageable.

In another preferred embodiment, the asphalt component includes oxidized asphalt, also known as an air blown asphalt. Any oxidized asphalt may be used in accordance with the invention. In a preferred embodiment, the oxidized asphalt is selected from the group consisting of Type I, Type II, Type III and Type IV. More preferably the oxidized asphalt is selected from the group consisting of Type II, Type III and Type IV. In a particularly preferred embodiment, the oxidized asphalt is Type IV.

The asphalt emulsion of the present invention may further include a dispersant, and/or a thixotropic agent, and/or a surfactant, and/or a catalyst, and/or an aromatic oil, and/or a resin, and/or a cross-linking agent, and/or a plasticizer, and/or a wax, and/or a polymer and/or combinations thereof. The dispersant may be any dispersant known in the art, such as an epoxy resin dispersant. For example, the dispersant may be Erisys® GA240, which is available from CVC Specialty Chemicals, Inc. (Moorestown, N.J.). Erisys® GA240 is 100% of a glycidyl ether of meta-xylenediamine.

The thixotropic agent may be any thixotropic agent known in the art, such as carboxy methylcellulose (CMC), which is available from several companies, including Hercules Chemical (Jiangmen) Co., Ltd. (Guangdong Province, China).

The surfactant may be any surfactant known in the art, such as Redicote® E-11, Redicote® AP and Redicote® C-450, all of which are available from Akzo Nobel (Amsterdam, Netherlands); Stepanol 250A and combinations thereof. Redicote® E-11 is a cationic surfactant containing 50% quaternary ammonium salt, 35% isopropanol and 15% water (by weight). Redicote® AP contains 62.5% alkoxylated fatty polyamines, 33.5% solvent(s) and 8% fatty acids (by weight). Redicote® C-450 is a cationic surfactant containing 100% fatty amine by weight. Stepanol 250A, available from Stepan Company (Northfield, Ill.), is an anionic surfactant. Stepanol 250A also includes a resin, a cross-linking agent and a plasticizer and, therefore, may also be used in the present invention for any of those purposes or a combination thereof.

The catalyst may be any catalyst known in the art, such as UP 1935, hydrochloric acid (HCl) and combinations thereof.

UP 1935 is a vulcanizer dispersion available from Ultrapave® Corporation (Dalton, Ga.).

The aromatic oil may be any aromatic oil known in the art, for example, kerosene, heavy lube oil, diesel fuel or combinations thereof. The presence of the aromatic oil decreases the viscosity of the asphalt emulsion and also makes the emulsion more stable. It is believed that the kerosene provides bonding, attraction, low viscosity, easy penetration between joints and increase tensile value. It is further believed that heavy lube oil, such as motor oil, provides flexibility to the fibrous mats of the invention. Diesel fuel comprises kerosene and heavy lube oil.

The resin may be any resin known in the art, such as urea formaldehyde, Sylvatac® RE 100, Stepanol 250A and combinations thereof. Sylvatac® RE 100 is 100% of a pentaerythritol ester of rosin, which is available from Arizona Chemical (Jacksonville, Fla.).

The cross-linking agent may be any cross-linking agent known in the art, such as castor oil, Stepanol 250A and combinations thereof. Castor oil is available from several companies, including Cargill, Incorporated (Minneapolis, Minn.).

The wax may be any wax known in the art, including waxes made from polyethylene such as CWP561, waxes made from petroleum such as CWP461, waxes made from coal such as H6 and waxes made from natural gas such asC105, all of which are available from Chusei, (USA) Inc. (Pasadena, Tex.).

The polymer may be any polymer known in the art, such as styrene butadiene (SBR), including Rovene® 4040. Rovene® 4040 is a nonionic emulsion of carboxy modified styrene butadiene polymer available from Mallard Creek Polymers, Inc. (Charlotte, N.C.).

In a preferred embodiment of the invention, the asphalt emulsion may include combinations of the following: from about 1.0% to about 50%, more preferably from about 5% to about 25%, asphalt component; from about 0.01% to about 1.0%, more preferably from about 0.1% to about 0.5%, dispersant; from about 0.01% to about 1.0%, more preferably from about 0.1% to about 0.5%, thixotropic agent; from about 0.01% to about 2.0%, more preferably from about 0.1% to about 1.0%, surfactant; from about 0.01% to about 2.0%, more preferably from about 0.1% to about 1.0%, catalyst; from about 0.01% to about 1.0%, more preferably from about 0.1% to about 0.5%, aromatic oil; from about 0% to about 50%, more preferably from about 0.1% to about 25%, resin; from about 0.01% to about 1.0%, more preferably from about 0.1 to about 0.5%, cross-linking agent; from about 0.01% to about 1.5%, more preferably from about 0.1% to about 0.75%, plasticizer; from about 0.01% to about 1.5%, more preferably from about 0.1% to about 0.75, wax; from about 0% to about 5%, more preferably from about 0.1% to about 1.5%, polymer or combinations thereof.

In an additional preferred embodiment of the invention, the asphalt emulsion consists essentially of an asphalt component, a dispersant, a thixotropic agent, a surfactant, a catalyst, an aromatic oil, and optionally, a polymer. In a preferred embodiment, the asphalt emulsion consists essentially of from about 5% to about 50%, more preferably from about 10% to about 30%, asphalt component; from about 0.01% to about 1.0%, more preferably from about 0.1% to about 0.5%, dispersant; from about 0.01% to about 1.0%, more preferably from about 0.1% to about 0.5%, thixotropic agent; from about 0.01% to about 1.0%, more preferably from about 0.1% to about 0.5%, surfactant; from about 0.01% to about 2.0%, more preferably from about 0.1% to about 1.0%, catalyst; and from about 0.01% to about 1.0%, more preferably from about 0.1% to about 0.5%, aromatic oil. The asphalt emulsion may optionally include from about 0% to about 5% polymer, preferably from about 0.1% to about 1.5% polymer. In a preferred embodiment, the asphalt component is selected from the group consisting of solvent extracted asphalt, oxidized asphalt, and combinations thereof; the dispersant is Erisys® GA240; the thixotropic agent is CMC; the surfactant is selected from the group consisting of Redicote® E-11, Redicote® AP, Redicote® C-450, and combinations thereof; the catalyst is selected from the group consisting of UP 1935, HCl, and combinations thereof; and the aromatic oil is diesel fuel. In a preferred embodiment, the diesel fuel contains about 65% kerosene and about 35% heavy lube oil, such as motor oil.

In another preferred embodiment of the invention, the asphalt emulsion consists essentially of an asphalt component, a dispersant, a thixotropic agent, a resin, and optionally, a polymer. In a preferred embodiment, the asphalt emulsion consists essentially of from about 1.0% to about 50%, more preferably from about 5% to about 40%, asphalt component; from about 0.01% to about 1.0%, more preferably from about 0.1% to about 0.5%, dispersant from about 0.01% to about 1.0%, more preferably from about 0.1% to about 0.5%, thixotropic agent; and from about 1.0% to about 50%, more preferably from about 5% to about 25%, resin. The asphalt emulsion may optionally include from about 0% to about 5% polymer, preferably from about 0.1% to about 1.5% polymer. In a preferred embodiment, the asphalt component is selected from the group consisting of solvent extracted asphalt, oxidized asphalt, and combinations thereof; the dispersant is Erisys® GA240; the thixotropic agent is CMC; and the resin is urea formaldehyde.

In yet another preferred embodiment of the invention, the asphalt emulsion consists essentially of an asphalt component, a dispersant, a thixotropic agent, a surfactant, a catalyst, a resin, and optionally, a polymer. In a preferred embodiment, the asphalt emulsion consists essentially of from about 1.0% to about 50%, more preferably from about 5% to about 25%, asphalt component; from about 0.01% to about 1.0%, more preferably from about 0.1% to about 0.5%, dispersant; from about 0.01% to about 1.0%, more preferably from about 0.1% to about 0.5%, thixotropic agent; from about 0.01% to about 2.0%, more preferably from about 0.1% to about 1%, surfactant; from about 0.01% to about 2.0%, more preferably from about 0.1% to about 1%, catalyst; and from about 1.0% to about 50%, more preferably from about 5% to about 20%, resin. The asphalt emulsion may optionally include from about 0% to about 5% polymer, preferably from about 0.1% to about 1.5% polymer. In a preferred embodiment, the asphalt component is selected from the group consisting of solvent extracted asphalt, oxidized asphalt, and combinations thereof; the dispersant is Erisys® GA240; the thixotropic agent is CMC; the surfactant is selected from the group consisting of Redicote® E-11, Redicote® AP, Redicote® C-450, and combinations thereof; the catalyst is selected from the group consisting of UP 1935, HCl, and combinations thereof; and the resin is urea formaldehyde.

In a further preferred embodiment of the invention, the asphalt emulsion consists essentially of an asphalt component, a surfactant, a catalyst, a resin, a cross-linking agent, a plasticizer, a wax, and optionally, a polymer. In a preferred embodiment, the asphalt emulsion consists essentially of from about 5% to about 50%, more preferably from about 10% to about 40%, asphalt component from about 0.1% to about 2.0%, more preferably from about 0.1% to about 1.0%, surfactant; from about 0.01% to about 2.0%, more preferably from about 0.1% to about 1.0%, catalyst; from about 0.1% to about 15%, more preferably from about 0.1% to about 10%, resin; from about 0.01% to about 1.0%, more preferably from about 0.1% to about 0.5%, cross-linking agent; from about 0.01% to about 2.0%, more preferably from about 0.1% to about 1.0%, plasticizer; and from about 0.01% to about 1.0%, more preferably from about 0.1% to about 0.5%, wax. The asphalt emulsion may optionally include from about 0% to about 5% polymer, preferably from about 0.1% to about 1.5% polymer. In a preferred embodiment, the asphalt component is selected from the group consisting of solvent extracted asphalt, oxidized asphalt; and combinations thereof; the surfactant is Stepanol 250A; the catalyst is UP 1935; the resin is selected from the group consisting of RE-100, Stepanol 250A, and combinations thereof; the cross-linking agent is selected from the group consisting of castor oil, Stepanol 250A, and combinations thereof; the plasticizer is Stepanol 250A; and the wax is selected from the group consisting of CWP561, CWP461, H6 and C105.

An advantage of the present invention is that heat exchangers are not required during the asphalt emulsion making process. The hot asphalt, which is preferably approximately 330° F. to approximately 350° F. is mixed with components that are at or about room temperature (~75° F.) (see Examples below). The mixture results in an emulsion whose temperature is below the boiling point of water, i.e., below 212° F., so that significant amounts of water that form the emulsion are not lost during the asphalt emulsion making process. This eliminates the need for additional equipment for cooling and thus enables cost savings.

Fibrous Mats

Asphalt roofing materials, including shingles, have traditionally and extensively been manufactured by using as a base a fibrous mat such as a sheet of roofing felt or fiberglass mat, impregnating the fibrous mat with a bituminous material and coating one or both surfaces of the impregnated mat with a weather-resistant bituminous coating material. Usually there is applied to the bituminous coating on the surface intended to be exposed to the weather a suitable granular material such as slate granules or mineral surfacing. Finely divided materials such as mica flakes, talc, silica dust or the like may be made adherent to the non-weather exposed surface of the roofing shingle to prevent sticking of the adjacent layers of the roofing material in packages.

In the present invention, a fibrous mat is provided which is made with an asphalt emulsion which allows for the preparation of the mat and building materials made therefrom with improved tear resistance and tensile strength. The fibrous mats, and thus the building products employing them, may also be lighter in weight and cost effective.

The fibrous mat includes a fiber component and a binder component. The fiber component is any suitable fiber. In a preferred embodiment, the fiber component comprises glass fibers. A particularly preferred fiber component is glass fibers supplied in bundles of glass fibers of various lengths. In a particularly preferred embodiment, the glass fibers are from about 1.0" to about 1⅜" in length. In a more preferred embodiment, the glass fibers are 1¼" in length, available from Owens Corning® (Toledo, Ohio). The glass fibers are preferably mixed with water, a dispersant and a viscosity modifier and preferably formed into a wet-laid web prior to the application of the binder component of the invention. Suitable binder components include an asphalt-based binder made from an asphalt emulsion of the present invention. The fibrous mats of the present invention comprise from about 50% to about 68% fiber component and from about 32% to about 50% binder component.

Processes for Making Fibrous Mats

In the present invention, processes are provided for manufacturing fibrous mats which employ the use of amphoteric surfactants. After the formation of a wet fiber web from a fiber dispersion, the amphoteric surfactant is applied to the wet fiber web prior to the application of a binder component to the web. The fiber mats made by the processes described herein preferably include a binder component made with an asphalt emulsion which allows for the preparation of a mat and building materials made therefrom with improved tear resistance and tensile strength and which may also be lighter in weight and cost effective.

Figure 1:
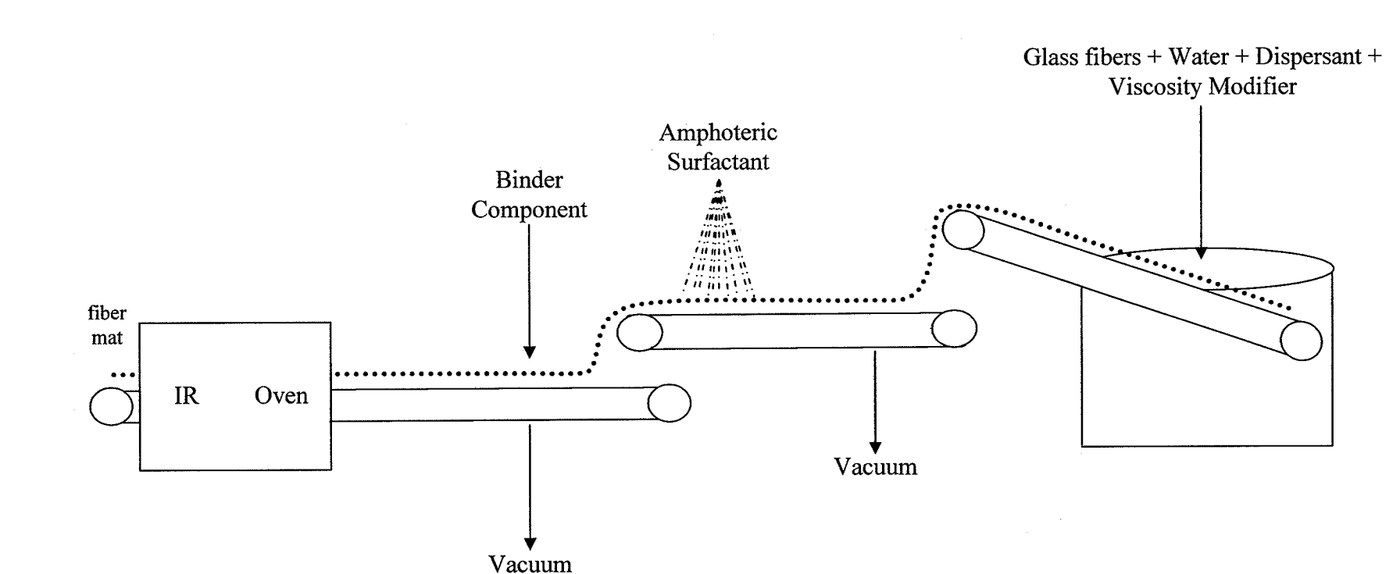
FIG. 1 shows a schematic representation of an exemplary process in accordance with the invention.

With reference to FIG. 1, the process includes preparing a fiber dispersion by combining chopped fibers with at least water, one dispersant and a viscosity modifier. The dispersion may be prepared in a conventional head box, as shown in FIG. 1. In a further embodiment, the wet fiber web is prepared from the dispersion on a conveyor belt with the aid of a vacuum, as shown in FIG. 1.

The fiber component is any suitable fiber useful for making fibrous mats. Preferred fiber components comprise glass fibers. A particularly preferred fiber component is glass fibers supplied in bundles of various lengths. In a particularly preferred embodiment, the glass fibers are from about 1.0" to about 1⅜" in length. In a more preferred embodiment, the glass fibers are 1¼" in length, available from Owens Corning®. The glass fibers are preferably mixed with water, a dispersant and a viscosity modifier to form a fiber dispersion. The fiber dispersion is then formed into the wet-laid web prior to the application of the binder component. The dispersant and the viscosity modifier are preferably anionic. In a particularly preferred embodiment, Nalco® 01NM159, available from Nalco Company (Naperville, Ill.), is the dispersant and Naiclear® 7768, which is an anionic acrylamide copolymer available from Nalco Company, is the viscosity modifier.

In one embodiment of the invention, the process comprises treating a wet fiber web with an amphoteric surfactant. In a preferred embodiment, the web is treated with a solution of the amphoteric surfactant applied as a spray. The amphoteric surfactant is preferably in an amount from about 0.25% to about 2.5%. In a particularly preferred embodiment, 1% amphoteric surfactant is used and is diluted in water. A preferred amphoteric surfactant of the invention is an aliphatic acid, such as Chemfroth XY®, which is available from Chem-Tex Laboratories, Inc. (Concord, N.C.). Other surfactants may also be used in accordance with the invention. Other surfactants that may be used include Chemtex® A56-25, which is a cationic amine-quat complex, and Chemtex® A-12, which is non-ionic, both of which are also available from Chem-Tex Laboratories, Inc.

In a preferred embodiment of the invention, as shown in FIG. 1, the amphoteric surfactant is applied to the wet fiber web as a spray after a vacuum has been applied. Preferably, no vacuum is applied when the surfactant is being sprayed onto the wet fiber web.

In a further preferred embodiment of the invention, after the wet web is treated with the amphoteric surfactant, a binder component is applied to the treated wet web. In a particularly preferred embodiment, a vacuum is applied to the treated wet web at approximately the same time as the binder component is being applied to the treated wet web, as shown in FIG. 1.

In another preferred embodiment, the binder component is a cationic binder component. A particularly preferred binder component is an asphalt-based binder made from an asphalt emulsion of the present invention.

After the binder component is applied to the treated wet fiber web, the web may be dried in an oven at approximately 350° F. to 400° F. and then exposed to infrared (IR) rays for cross-linking at approximately 2200° F.

Without being bound by any particular theory, Applicants believe that the amphoteric surfactant of the present invention, which has a neutral charge, i.e., it includes both positive and negative charges, causes the loose welds in the wet web to open to some degree, thereby enabling at least some of the negatively charged dispersant and viscosity modifier therein to be released, and permitting cationic binder to enter the weld area to enhance binding between the negatively charged glass fibers. It is believed that some of the dispersant and viscosity modifier present in the fiber dispersion are displaced from the welds between the fibers due to the anionic component of the surfactant and also due to the force of the spray. The result is a wet fiber web that is stronger and can be processed at a faster rate. The resultant fiber mats prepared by the processes of the invention have excellent tear resistance and tensile strength. In one embodiment of the invention, the fiber mat appears more tightly packed and less susceptible to peeling than fiber mats made by conventional methods.

EXAMPLES

Example 1

Table I below provides the components of an asphalt emulsion made in accordance with one embodiment of the invention. Four parts, A, B, C and D, were prepared and then mixed together. After the four parts were mixed together, the mixture contained a total concentration of 72% of all the components. The mixture was then diluted with water to make a final emulsion having a final concentration of 30% of all the components. This final emulsion was applied as a binder to a wet-laid glass fiber web.

TABLE I

| Component | A | B | C | D |
|---|---|---|---|---|
| PDA | 68% | — | — | — |
| HCl | — | 1.0% | — | — |
| Redicote ® E-11 | — | 1.0% | — | — |
| CMC | — | 0.5% | — | — |
| GA240 | — | — | 0.5% | — |
| UP 1935 | — | — | 0.5% | — |
| Diesel fuel | — | — | — | 0.5% |
| Total | 68% | 2.5% | 1% | 0.5% |
| Temperature | 330-350° F. | 75° F. | 75° F. | 75° F. |

Table II provides data showing the physical properties of exemplary fibrous mats of the invention (test), which are made with the above embodiment of asphalt emulsion, as compared to control mats made with urea formaldehyde as the binder. Test coupon refers to exemplary fibrous mats of the invention coated with asphalt in a manner similar to the production of roofing shingles. Test samples 1-7, test coupon samples 1-6, control samples 1 and 2, and control coupon samples 1 and 2 were made with glass fibers that are 1¼" in length. Where it is indicated that SBR was used, 2.5% Rovene® 4040 was used. Where it is indicated that the samples are either "hot" or "cold," this means that the binder was applied to the glass fibers at either approximately 165° F. ("hot") or at room temperature ("cold").

TABLE II

| | Tear Avg (gr) | Tear Min (gr) | Tear Max (gr) | LOI* (%) | Basis Weight (lbs./sq.) | Thickness (mm) | Tensile Avg (lbs.) | Tensile Min (lbs.) | Tensile Max (lbs.) |
|---|---|---|---|---|---|---|---|---|---|
| Test 1 (cold) | 493 | 353 | 571 | 30 | 1.62 | 26 | 75 | 50 | 100 |
| Test 2 (hot) | 723 | 642 | 845 | 29 | 1.57 | 32 | 57 | 51 | 76 |
| Test 3 (cold + SBR) | 795 | 710 | 867 | 30 | 1.59 | 27 | 88 | 76 | 100 |
| Test 4 (cold) | 721 | 638 | 772 | 32 | 1.6 | 26 | 91 | 86 | 97 |
| Test 5 (cold + SBR) | 418 | 292 | 521 | 28 | 1.57 | 27 | 75 | 60 | 86 |
| Test 6 (hot) | 596 | 449 | 742 | 30 | 1.61 | 27 | 79 | 76 | 83 |
| Test 7 (hot + SBR) | 913 | 1025 | 800 | 35 | 1.21 | 24 | 99 | 80 | 118 |
| Control 1 (cold + polymer) | 314 | 265 | 380 | 15.8 | 1.59 | 33 | 76 | 73 | 79 |
| Control 2 (cold + polymer) | 366 | 300 | 416 | 14.8 | 1.55 | 26 | 67 | 58 | 77 |
| Test coupon 1 | 904 | 794 | 1123 | | | 58 | | | |
| Test coupon 2 | 989 | 826 | 1326 | | | 60 | | | |
| Test coupon 3 | 1083 | 979 | 1229 | | | 60 | | | |
| Test coupon 4 | 808 | 707 | 894 | | | 58 | | | |
| Test coupon 5 | 923 | 774 | 1114 | | | 57 | | | |
| Test coupon 6 | 869 | 758 | 1072 | | | 58 | | | |
| Control coupon 1 | 873 | 764 | 1020 | | | 63 | | | |
| Control coupon 2 | 808 | 712 | 883 | | | 60 | | | |

*LOI = Loss on Ignition

The data in Table II show that exemplary fibrous mats made in accordance with the invention have equal to or better tear resistance and tensile strength as compared to control conventional fibrous mats. In addition, a lighter weight fibrous mat may be used in accordance with the invention and still achieve the required tear resistance and tensile strength for preparing building materials employing the fibrous mats, in particular, roofing shingles.

Example 2

Table III below provides the components of an asphalt emulsion made in accordance with another embodiment of the invention. Three parts, A, B and C, were prepared and then mixed together. After the three parts were mixed together, the mixture contained a total concentration of 100% of all the components. The mixture was then diluted with water to make a final emulsion having a final concentration of 30% of all the components. This final emulsion was applied as a binder to a wet-laid glass fiber web.

TABLE III

| Component | A | B | C |
|---|---|---|---|
| PDA | 30% | — | — |
| CMC | — | 0.5% | — |
| GA240 | — | 0.5% | — |
| Urea formaldehyde | — | — | 69% |
| Total | 30% | 1% | 69% |
| Temperature | 330-350° F. | 75° F. | 75° F. |

Table IV provides data showing the physical properties of exemplary fibrous mats of the invention (test), which are made with the above embodiment of asphalt emulsion, as compared to control mats made with 90% urea formaldehyde and 10% GL-618 acrylic (Rohm and Haas; Philadelphia, Pa.) as the binder. Test coupon refers to exemplary fibrous mats of the invention coated with asphalt in a manner similar to the production of roofing shingles. Test samples 1-4, test coupon samples 1-3, control samples 1 and 2, and control coupon samples 1 and 2 were made with glass fibers that are 1¼" in length. Where SBR was added, 2.5% Rovene® 4040, available from Mallard Creek Polymers, was used. The examples that are referred to as either "hot" or "cold" indicate the temperature of the binder when it was applied to the glass fibers. When the binder was "hot" it was applied at approximately 165° F. "Cold" binder was applied at room temperature.

TABLE IV

| | Tear Avg (gr) | Tear Min (gr) | Tear Max (gr) | LOI* (%) | Basis Weight (lbs./sq.) | Thickness (mm) | Tensile Avg (lbs.) | Tensile Min (lbs.) | Tensile Max (lbs.) |
|---|---|---|---|---|---|---|---|---|---|
| Test 1 (cold + SBR) | 662 | 536 | 825 | 30 | 1.6 | 25 | 90 | 83 | 94 |
| Test 2 (cold) | 456 | 339 | 627 | 29 | 1.62 | 22 | 66 | 65 | 67 |
| Test 3 (hot) | 465 | 401 | 542 | 26 | 1.56 | 21 | 82 | 67 | 98 |
| Test 4 (hot + SBR) | 806 | 700 | 911 | 40 | 1.2 | 18 | 76 | 74 | 79 |
| Control 1 (cold + polymer) | 314 | 265 | 380 | 15.8 | 1.59 | 33 | 76 | 73 | 79 |
| Control 2 (cold + polymer) | 366 | 300 | 416 | 14.8 | 1.55 | 26 | 67 | 58 | 77 |
| Test coupon 1 | 1078 | 950 | 1248 | | | 57-60 | | | |
| Test coupon 2 | 1088 | 801 | 1302 | | | 60 | | | |
| Test coupon 3 | 926 | 825 | 1020 | | | 57 | | | |

TABLE IV-continued

| | Tear Avg (gr) | Tear Min (gr) | Tear Max (gr) | LOI* (%) | Basis Weight (lbs./sq.) | Thickness (mm) | Tensile Avg (lbs.) | Tensile Min (lbs.) | Tensile Max (lbs.) |
|---|---|---|---|---|---|---|---|---|---|
| Control coupon 1 | 873 | 764 | 1020 | | | 63 | | | |
| Control coupon 2 | 808 | 712 | 883 | | | 60 | | | |

*LOI = Loss on Ignition

The data in Table IV show that exemplary fibrous mats made in accordance with the invention have equal to or better tear resistance and tensile strength as compared to the conventional fibrous mats. In addition, a lighter weight fibrous mat may be used in accordance with the invention and still achieve the required tear resistance and tensile strength for preparing building materials employing the fibrous mats, in particular, roofing shingles.

Example 3

Table V below provides the components of an asphalt emulsion made in accordance with yet another embodiment of the invention. Five parts, A, B, C, D and E, were prepared and then mixed together. After the five parts were mixed together, the mixture contained a total concentration of 70% of all the components. The mixture was then diluted with water to make a final emulsion having a final concentration of 30% of all the components. This final emulsion was applied as a binder to a wet-laid glass fiber web.

TABLE V

| Component | A | B | C | D | E |
|---|---|---|---|---|---|
| PDA | 33.5% | — | — | — | — |
| HCl | — | — | — | 1.0% | — |
| Redicote ® E-11 | 0.5% | — | — | 1.0% | — |
| Redicote ® AP | 0.5% | — | — | — | — |
| Redicote ® C-450 | 0.5% | — | — | — | — |
| CMC | — | — | 1.0% | — | — |
| GA240 | — | 1.0% | — | — | — |
| UP 1935 | — | — | — | 0.2 | — |
| Urea formaldehyde | — | — | — | — | 30.8% |
| Total | 35% | 1% | 1% | 2.2% | 30.8% |
| Temperature | 330-350° F. | 75° F. | 75° F. | 75° F. | 75° F. |

Table VI below provides data showing the physical properties of an exemplary fibrous mat of the invention (test), which are made with the above embodiment of asphalt emulsion, as compared with control mats made with urea formaldehyde as binder. Test coupon refers to exemplary fibrous mats of the invention coated with asphalt in a manner similar to the production of roofing shingles. Test sample and control sample were made with glass fibers that are 1¼" in length.

TABLE VI

| Sample | Tear Avg (gr) | Tear Min (gr) | Tear Max (gr) | LOI* (%) | Basis Weight (lbs./sq.) | Thickness (mm) | Tensile Avg (lbs.) | Tensile Min (lbs.) | Tensile Max (lbs.) |
|---|---|---|---|---|---|---|---|---|---|
| Test 1 | 548 | 371 | 809 | 40 | 1.19 | 24 | 72 lbs | 70 lbs | 74 lbs |
| Control 1 (cold + polymer) | 314 | 265 | 360 | 15.8 | 1.6 | 33 | 67 | 58 | 77 |

*LOI = Loss on Ignition

The data in Table VI show that exemplary fibrous mats made in accordance with the invention have equal to or better tear resistance and tensile strength as compared to conventional fibrous mats. In addition, a lighter weight fibrous mat may be used in accordance with the invention and still achieve the required tear resistance and tensile strength for preparing building materials employing the fibrous mats, in particular, roofing shingles.

Example 4

Table VII below provides the components of an asphalt emulsion made in accordance with a further embodiment of the invention. Three parts, A, B and C, were prepared and then mixed together. After the three parts were mixed together, the mixture contained a total concentration of 88% of all the components. The mixture was then diluted with water to make a final emulsion having a final concentration of 30% of all the components. This final emulsion was applied as a binder to a wet-laid glass fiber web.

TABLE VII

| Component | A | B | C |
|---|---|---|---|
| PDA | 80% | — | — |
| RE 100 | — | 1.0% | — |
| CWP461 | — | 0.5% | — |
| Castor oil | — | 0.5% | — |
| Stepanol 250A | — | — | 5% |
| UP 1935 | — | — | 1.0% |
| Total | 80% | 2% | 6% |
| Temperature | 330-350° F. | 250° F. | 75° F. |

Table VIII below provides data showing the physical properties of an exemplary fibrous mat of the invention (test), which are made with the above embodiment of asphalt emulsion, as compared with control mats made with urea formaldehyde as binder. Test coupon refers to exemplary fibrous mats of the invention coated with asphalt in a manner similar to the production of roofing shingles. Test sample and control sample were made with glass fibers that are 1¼" in length.

TABLE VIII

| Sample | Tear Avg (gr) | Tear Min (gr) | Tear Max (gr) | LOI* (%) | Basis Weight (lbs./sq.) | Thickness (mm) | Tensile Avg (lbs.) | Tensile Min (lbs.) | Tensile Max (lbs.) |
|---|---|---|---|---|---|---|---|---|---|
| Test 1 | 579 | 525 | 627 | 41.7 | 1.22 | 24 | 98 | 83 | 116 |
| Control 1 (cold + polymer) | 374 | 265 | 360 | 15.8 | 1.6 | 33 | 67 | 58 | 77 |

*LOI = Loss on Ignition

Table IX below provides data showing the aging effects of high heat and humidity on the tear strength of a test sample and a control sample which was conducted at 140° F. at 100% humidity.

TABLE IX

| Sample | 0 hours | 5 weeks |
|---|---|---|
| Test | 853 gr | 742 gr |
| Control | 307 gr | 217 gr |

Exemplary fibrous mats made in accordance with the invention have equal to or better tear resistance and tensile strength as compared to conventional fibrous mats. In addition, a lighter weight fibrous mat may be used in accordance with the invention and still achieve the required tear resistance and tensile strength for preparing building materials employing the fibrous mats, in particular, roofing shingles.

It should be understood that the above examples are illustrative, and that compositions other than those described above can be used while utilizing the principles underlying the present invention.

What is claimed is:

1. A process for manufacturing a fibrous mat comprising the steps of:
   a. preparing a fiber dispersion comprising chopped fibers, with at least water, one dispersant and a viscosity modifier;
   b. forming a wet fiber web with the fiber dispersion;
   c. applying an amphoteric surfaactant to the wet fiber web; and
   d. applying a binder component to the surfactant-covered web to form the fibrous mat; wherein the binder component consists of an asphalt emulsion.

2. The process according to claim 1, wherein the dispersant and the viscosity modifier are anionic.

3. The process according to claim 1, wherein the dispersant is anionic.

4. The process according to claim 1, wherein the viscosity modifier is anionic.

5. A process for manufacturing a fibrous mat comprising the step of:
   a. preparing a fiber dispersion;
   b. forming a wet fiber web with the fiber dispersion;
   c. applying an amphoteric surfactant to the wet fiber web;
   d. applying a binder component to the surfactant-covered web to form the fibrous mat; wherein the binder component consists essentially of an asphalt emulsion; and
   e. applying a vacuum at approximately the same time as the binder component is being applied.

6. A process for manufacturing a fibrous mat comprising the steps of:
   a. preparing a fiber dispersion;
   b. forming a wet fiber web with the fiber dispersion;
   c. applying an amphoteric surfactant to the wet fiber web;
   d. applying a binder component to the surfactant-covered web to form the fibrous mat; wherein the binder component consists essentially of an asphalt emulsion; and
   e. drying the fibrous mat at approximately 350° F. to approximately 400° F.

7. The process according to claim 6, wherein the process further comprises the step of exposing the fibrous mat to infrared rays at approximately 2200° F.

8. A process for manufacturing a fibrous mat comprising the step of:
   a. preparing a fiber dispersion;
   b. forming a wet fiber web with the fiber dispersion;
   c. applying an amphoteric surfactant to the wet fiber web; and
   d. applying a binder component to the surfactant-covered web to form the fibrous mat; wherein the binder component consists essentially of an emulaion; wherein the asphalt emulsionconsists essentially of an asphalt component, a dispersant, a thixotropic agent, a surfactant, a catalyst, and an aromatic oil; and wherein the aromatic oil comprises diesel fuel having about 65% by weight kerosene and about 35% by weight heavy lube oil.

9. A process for manufacturing a fibrous mat comprising the steps of:
   a. preparing a fiber dispersion;
   b. forming a wet fiber web with the fiber dispersion;
   c. applying an amphoteric surfactant to the wet fiber web; and
   d. applying a binder component to the surfactant-covered web to form the fibrous mat; wherein the binder component consists essentially of an emulaion; wherein the asphalt emulsion consists essentially of an asphalt component, a dispersant, a thixotropic agent, a surfactant, a catalyst, an aromatic oil and a polymer, and wherein the aromatic oil comprises diesel fuel having about 65% by weight kerosene and about 35% by weight heavy lube oil.

10. The process according to claim 1, 5, 6, 8, or 9, wherein the surfactant concentration is from about 0.25% to about 2.5% by weight.

11. The process according to claim 10, wherein the surfactant is selected from the group consisting of an aliphatic acid, a cationic amine-quat complex, and a non-ionic surfactant.

12. The process according to claim 1, 5, 6, 8, or 9, wherein the fiber is glass fiber.

13. The process according to claim 12, wherein the glass fiber is from about 1.0" to about 1⅜" in length.

14. A fibrous mat manufactured by the process according to claim 1, 5, 6, 8, or 9.

15. A roofing material comprising the fibrous mat according to claim 14.

16. The process according to claim 1, 5, 6, 8, or 9, wherein the asphalt emulsion consists essentially of an asphalt component, a dispersant, a thixotropic agent, and a resin; and wherein the dispersant is an epoxy resin dispersant.

17. The process according to claim 1,5,6,8, or 9, wherein the asphalt emulsion consists essentially of an asphalt component, a dispersant, a thixotropic agent, a resin, and a polymer; and wherein the dispersant is an epoxy resin dispersant.

18. The process according to claim 1,5,6,8, or 9, wherein the asphalt emulsion consists essentially of an asphalt component, a dispersant, a thixotropic agent, a surfactant, a catalyst, and a resin; and wherein the dispersant is an epoxy resin dispersant.

19. The process according to claim 1,5,6,8, or 9, wherein the asphalt emulsion consists essentially of an asphalt component, a dispersant, a thixotropic agent, a surfactant, a catalyst, a resin and a polymer; and wherein the dispersant is an epoxy resin dispersant.

20. The process according to claim 1,5,6,8, or 9, wherein the asphalt emulsion consists essentially of an asphalt component, a surfactant, a catalyst, a resin, a cross-linking agent, a plasticizer, and a wax.

21. The process according to claim 1,5,6,8, or 9, wherein the asphalt emulsion consists essentially of an asphalt component, a surfactant, a catalyst, a resin, a cross-linking agent, a plasticizer, a wax, and a polymer.

* * * * *

UNITED STATES PATENT AND TRADEMARK OFFICE
CERTIFICATE OF CORRECTION

| | |
|---|---|
| PATENT NO. | : 9,139,953 B2 |
| APPLICATION NO. | : 14/446739 |
| DATED | : September 22, 2015 |
| INVENTOR(S) | : Younger Ahluwalia |

It is certified that error appears in the above-identified patent and that said Letters Patent is hereby corrected as shown below:

IN THE SPECIFICATION

COLUMN 2:

Line 5, "compound" should read --compounds--.

COLUMN 6:

Line 26, "asC 105" should read --as C105--;
Line 48, "0.1" should read --0.1%--; and
Line 51, "0.75," should read --0.75%,--.

COLUMN 13:

Line 50, "are" should read --is--.

COLUMN 14:

Line 50, "are" should read --is--.

IN THE CLAIMS

COLUMN 16:

Line 29, "emulsionconsists" should read --emulsion consists--;
Line 31, "oil;" should read --oil,--; and
Line 43, "emulaion;" should read --asphalt emulsion,--.

Signed and Sealed this
Twenty-second Day of March, 2016

Michelle K. Lee
*Director of the United States Patent and Trademark Office*